(12) United States Patent
Shabazian et al.

(10) Patent No.: US 6,189,529 B1
(45) Date of Patent: Feb. 20, 2001

(54) COLLAPSIBLE COOKING APPARATUS

(76) Inventors: Michael R. Shabazian, 45 Belle La., Lee, NH (US) 03824; Deborah M. Tucker, 318 Runner Rd., Great Falls, VA (US) 22066

( * ) Notice: Under 35 U.S.C. 154(b), the term of this patent shall be extended for 0 days.

(21) Appl. No.: 09/431,214

(22) Filed: Nov. 1, 1999

(51) Int. Cl.$^7$ ...................................................... A47J 33/00
(52) U.S. Cl. .............................. 126/30; 126/26; 126/913
(58) Field of Search ................................ 126/25 R, 25 A, 126/29, 30, 9 R, 9 B, 26

(56) References Cited

U.S. PATENT DOCUMENTS

| | | | |
|---|---|---|---|
| 955,140 | * | 4/1910 | Cronk ........................................ 126/30 |
| 4,726,349 | * | 2/1988 | Gehrke ..................................... 126/9 R |
| 4,829,977 | * | 5/1989 | Valentine ................................. 126/9 R |
| 5,535,733 | * | 7/1996 | Hait .......................................... 126/26 |

* cited by examiner

Primary Examiner—Ira S. Lazarus
Assistant Examiner—Sara Clarke
(74) Attorney, Agent, or Firm—Michael W. York

(57) ABSTRACT

A collapsible cooking apparatus including a collapsible generally circular shaped hollow cooking enclosure that has containers in its interior for holding fuel during the cooking process. A collapsible structure is also included for suspending articles above or within the collapsible generally circular shaped hollow cooking enclosure for cooking or warming. This collapsible structure for suspending articles has a plurality of collapsible legs whose lower end portions are adapted to rest upon the ground or the like around the collapsible generally circular shaped hollow cooking enclosure when the collapsible cooking apparatus is assembled for cooking.

9 Claims, 4 Drawing Sheets

COLLAPSIBLE COOKING APPARATUS

BACKGROUND OF THE INVENTION

Currently there are several types of collapsible cooking apparatus, however there is no single cooking apparatus that allows food preparation for a group of people, such as a family, at one time and is portable for use in outdoor recreation. More and more state and federal laws and regulations are restricting or banning the use of bonfires and open-air barbecues. What is needed is a cooking apparatus that allows for barbecue style cooking but in a contained and clean-cook fashion for safety and anti-pollutant reasons. There exists a need for a cooking apparatus that not only has the capacity to cook for a large group of individuals, such as a family, at one time, but that has the means of moderating and adjusting the heat to cook different types of food.

In addition, most outdoor cooking apparatus take up a comparatively large volume of space and are too heavy for easy use in remote locations that are not readily accessible to a vehicle that can transport the cooking apparatus to its point of intended use. Ideally this apparatus needs to be easily portable, light in construction and able to collapse into a container that will fit in a standard backpack. Ideally this cooking apparatus should be easy to assemble, and tear down to return it to its original state for storage in its container ready for reuse and the cooking apparatus should be easy to dispose of any ash and food residue and easy to clean as well as be resistant to staining.

The requirements of the backpacker are very demanding since the backpacker needs a collapsible cooking apparatus that has the smallest possible volume as well. In addition, since a backpacker will have few if any tools the collapsible cooker must be easily assembled for use without any tools the backpacker will also, in many instances, be required to carry his or her fuel for the cooker and hence the collapsible cooker must be extremely efficient in its use of fuel since the fuel source may be fixed to a small amount without the ability for it to be replenished. Fire is also a possibility in many backpacking situations and hence it is important the a collapsible cooker for backpacking situations properly contact ignited fuel or fuel that could be ignited so that it does not pose a possible fuel hazard.

It is also important that a collapsible cooker be readily cleaned. This is particularly true in various outdoor situations where the access to cleaning facilities is limited such as in the case of backpacking or in remote camping situations.

Existing collapsible cookers are also difficult to readily assemble. This is particularly true when assembly is required under difficult conditions such as in low light conditions that are likely to be encountered when backpacking or camping.

The new collapsible cooking apparatus of this invention overcomes these problems and provide a collapsible cooking apparatus that is easy to use and safe to use to cook for varying numbers of people with different types of possible cooking techniques. The new collapsible cooking apparatus is light in weight, is very compact and yet it is easy to assemble without the need for any tools. The new collapsible cooking apparatus has portions that are used for more than one purpose.

SUMMARY OF THE INVENTION

This invention relates to cooking apparatus and more particularly to collapsible cooking apparatus.

Accordingly, it is an object of the invention to provide a collapsible cooking apparatus that is readily portable.

It is an object of the invention to provide a collapsible cooking apparatus that can be reduced to a small volume.

It is an object of the invention to provide a collapsible cooking apparatus that is light in weight.

It is an object of the invention to provide a collapsible cooking apparatus that is strong for its weight.

It is an object of the invention to provide a collapsible cooking apparatus that efficiently uses its structure.

It is an object of the invention to provide a collapsible cooking apparatus that has dual function structure.

It is an object of the invention to provide a collapsible cooking apparatus that has a wide range of cooking capacities.

It is an object of the invention to provide a collapsible cooking apparatus that can be used for cooking for a wide number of individuals.

It is an object of the invention to provide a collapsible cooking apparatus that can be used for various types of cooking.

It is an object of the invention to provide a collapsible cooking apparatus that can be configured for different types of cooking.

It is an object of the invention to provide a collapsible cooking apparatus that can be configured for cooking in an oven, grilling, simmering and warming.

It is an object of the invention to provide a collapsible cooking apparatus that can be configured for varying the cooking heat.

It is an object of the invention to provide a collapsible cooking apparatus that folds into a small package.

It is an object of the invention to provide a collapsible cooking apparatus that uses pivoting interconnected structures.

It is an object of the invention to provide a collapsible cooking apparatus that folds into a small package but deploys into a rigid structure for cooking.

It is an object of the invention to provide a collapsible cooking apparatus that safely handles the cooking fuel.

It is an object of the invention to provide a collapsible cooking apparatus that contains and controls the location of the fuel while it is burning, during its burning and in its partially burnt state.

It is an object of the invention to provide a collapsible cooking apparatus efficiently uses is fuel.

It is an object of the invention to provide a collapsible cooking apparatus that reduces fuel fire hazards.

It is an object of the invention to provide a collapsible cooking apparatus that contains fuel ashes and residue.

It is an object of the invention to provide a collapsible cooking apparatus that is easy to clean.

It is an object of the invention to provide a collapsible cooking apparatus that is maintenance free.

It is an object of the invention to provide a collapsible cooking apparatus that is rugged and reliable for its light weight.

It is an object of the invention to provide a collapsible cooking apparatus that is simple in its operation.

It is an object of the invention to provide a collapsible cooking apparatus that is easy to manufacture.

It is an object of the invention to provide a collapsible cooking apparatus that is inexpensive to manufacture.

These and other objects will be apparent from the collapsible cooking apparatus invention that includes a collapsible generally circular shaped hollow cooking enclosure that has triangular cross section hollow containers in its interior for holding fuel during the cooking process and a collapsible structure for suspending articles above or within the collapsible generally circular shaped hollow cooking enclosure for cooking or warming. The collapsible structure for suspending articles above the generally circular shaped hollow cooking enclosure has a plurality of collapsible legs whose lower end portions are adapted to rest upon the ground or the like around the collapsible generally circular shaped hollow cooking enclosure.

BRIEF DESCRIPTION OF THE DRAWINGS

The invention will be hereinafter more fully described with references to the accompanying drawings in which:

FIG. 5 is an enlarged view of a portion of the structure set forth in FIG. 2 taken within the circle 5 thereof;

DETAILED DESCRIPTION OF THE PREFERRED EMBODIMENT

Figure 1:
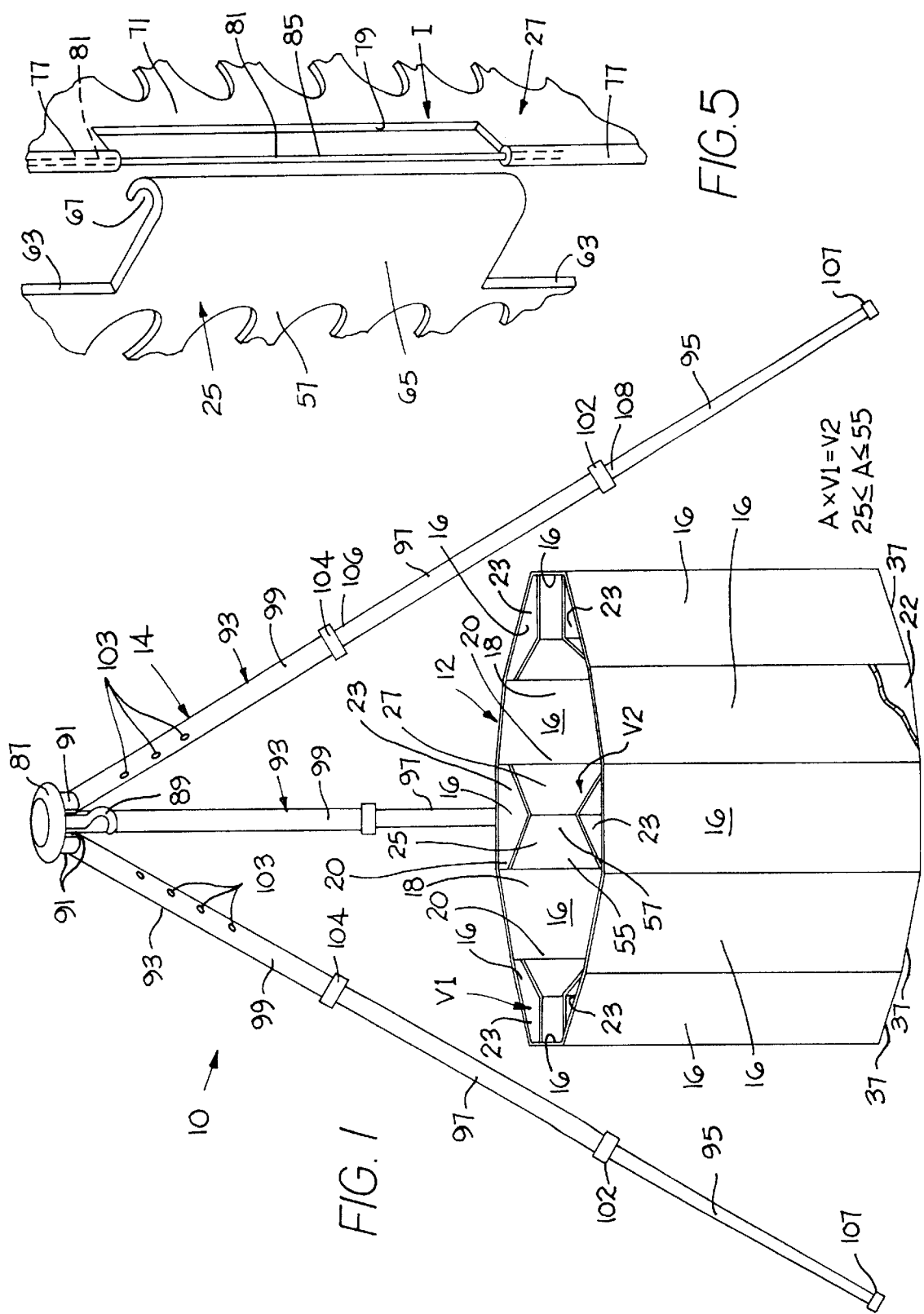
FIG. 1 is a perspective view of the assembled collapsible cooking apparatus invention with a portion broken away for clarity.

Referring first to FIG. 1 the collapsible cooking apparatus invention is illustrated in its assembled condition or configuration and is designated generally by the number 10. The collapsible cooking apparatus 10 includes a collapsible generally circular shaped hollow cooking enclosure that is designated generally by the number 12 and a collapsible suspension structure that is designated generally by the number 14. The generally circular shaped hollow cooking enclosure 12 is formed from a series of panels 16 whose opposite long edges are formed so that their long edges 18 and 20 are connected together in a manner that will be hereinafter described in greater detail.

The collapsible cooking apparatus 10 also includes a disposable thin foil flat bottom that is designated generally by the number 22. A number of these disposable thin foil bottoms 22 would be provided and once they are used they are disposed of in an appropriate trash container or the like.

Figure 2:
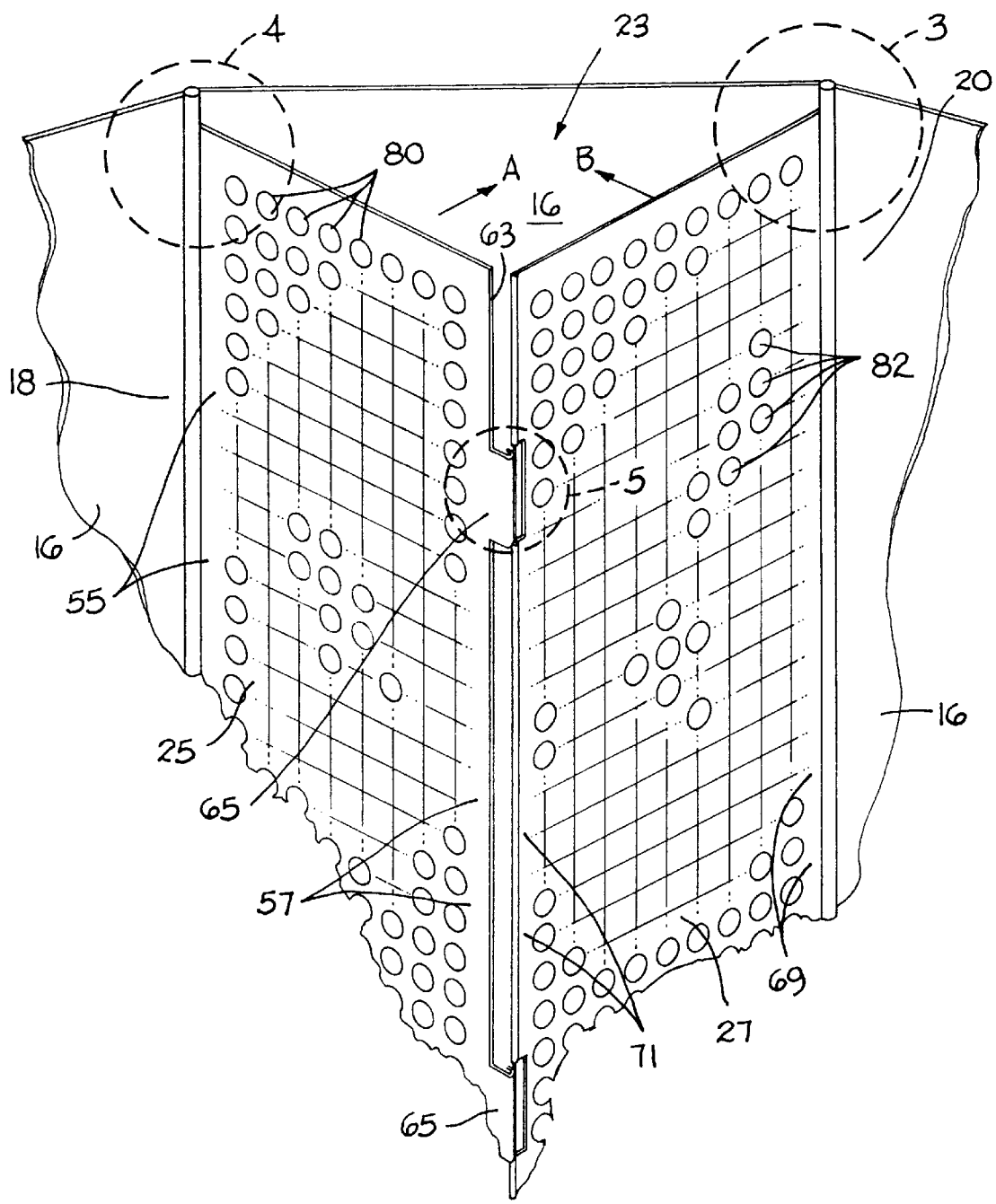
FIG. 2 is an enlarged view of a portion of the structure set forth in FIG. 1 illustrating a fuel chamber and adjacent structure.
Figure 3:
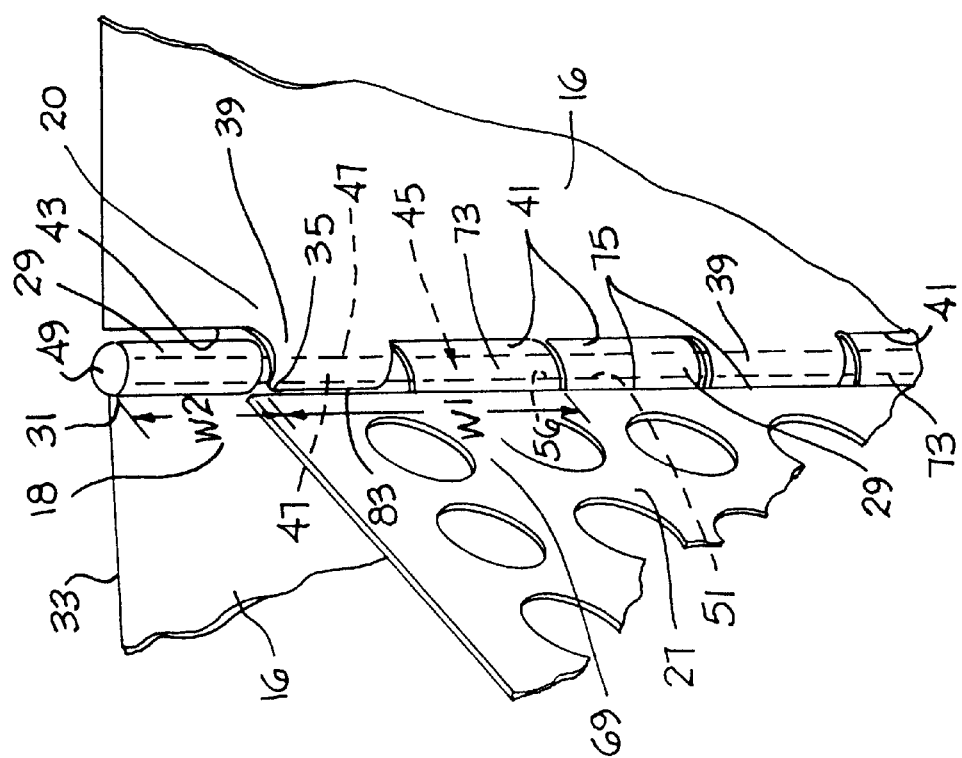
FIG. 3 is an enlarged view of a portion of the structure set forth in FIG. 2 taken within the circle 3 thereof.
Figure 4:
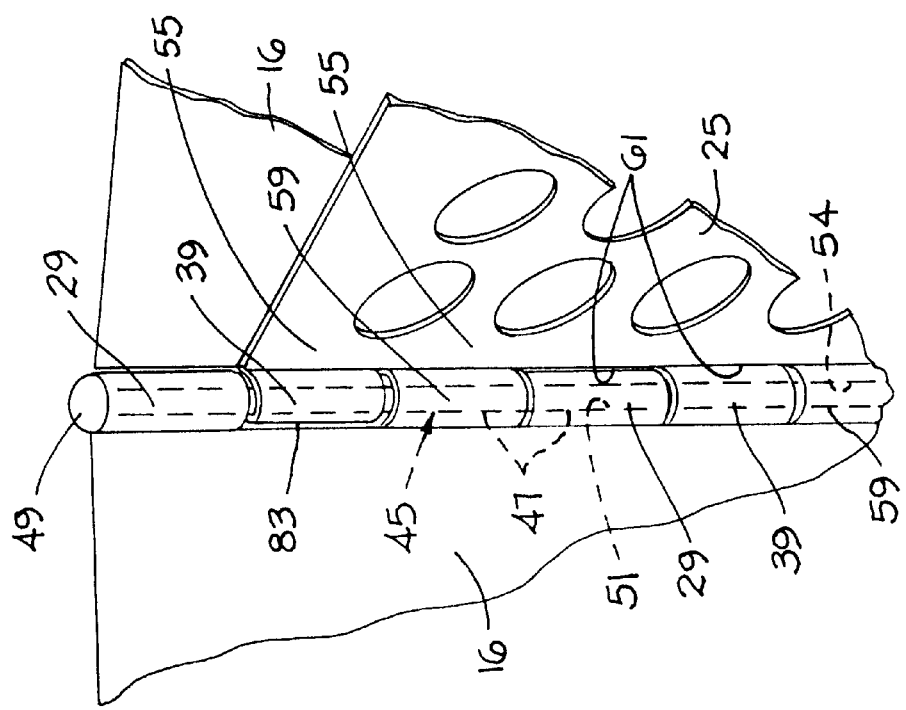
FIG. 4 is an enlarged view of a portion of the structure set forth in FIG. 2 taken within the circle 4 thereof.

FIG. 2 is an enlarged view of a portion of the cooking enclosure 12 illustrated in FIG. 1 and illustrates, along with FIGS. 3 through 5, how the fuel holding chambers 23 are formed by the panels 16 and fuel panels 25 and 27 and how the panels 16, 25 and 27 are connected. As illustrated in FIGS. 3 and 4, the edge portions 18 of each panel 16 have a rolled portions that form hollow hinge cylinders.

These hinge portions have important spatial relationships so that they function properly. As illustrated in FIG. 3, the hinge cylinders members located on the edge portion 18 are substantially identical and are designated by the number 29. It will be noted that uppermost hinge cylinder member 29 that has its upper edge portion 31 located adjacent to the upper edge 33 of the panel 16. This hinge member 29 is located adjacent an indentation 35 whose width W1 is substantially twice the width W2 of the hinge member 29. This same pattern is repeated down the edge portion 18 of the panel 16. That is, the hinge cylinder member 29 is followed by an adjacent indentation 35 on down to the bottom edge 37 of the panel 16.

The construction of the opposite edge portion 20 of the panel 16 is different from the edge portion 18. The edge portion 20 has a series of projections designated by the number 39 and the associated indentations that are designated by the number 41. The projections 39 have a width W2 and the indentations 41 a width W1. However the first indentation 43 from the top 33 of the panel 16 is different in that its width is equal to substantially one-half of the regular indentations 41 or is equal to W2. This indentation 43 is followed by a projection 39 that is in turn followed by an indentation 41 and this pattern of projections 39 and indentations 41 is repeated down the edge portion 20 to the bottom edge 37 of the panel 16.

As illustrated in FIGS. 3 and 4, identical hinge pin members 45 are used with the hinge members 29 on the edge portions 18 of the panels 16. In this connection, the hinge pin members 45 have a long substantially straight shank portion 47 and an enlarged head portion 49 located at the upper end of the shank portion 47. The shank portions 47 have a circular cross section whose diameter permits the shank portions 47 to be received in holes 51 in the hinge members 29 of the edge portions 18. It should be noted that the enlarged head portion 49 prevents the pin member 45 from slipping through the holes 51 in the hinge members 29.

The fuel holding chambers 23 are formed from a panel 16 plus two connected additional fuel panels 25 and 27 that are illustrated in FIGS. 1 through 5. The fuel panel 25 has a left edge hinge portion 55 and a right latch edge portion 57. The hinge edge portion 55 has a series of projecting hinge members 59 that alternate with adjacent indentations 61. These hinge projection members 59 have a width substantially equal to the width W2 and the indentations 61 have a width that is equal to the width W1. Consequently, the hinge projections 59 are sized to fit between the adjacent projections 29 and 39 of the adjacent panels 16 and the indentations 61 are sized to be equal to W1 and to receive the adjacent hinge projections 29 and 39 of the adjacent panels 16. The right latch edge portion 57 has a generally straight edge 63 with two projecting latch portions 65 that project outwardly from the edge 63. These projecting latch portions 65 each have a rolled hook portion 67 on its outer edge that is adapted to engage a portion of the fuel panel 27 as hereinafter described.

The fuel panel 27 is similar in construction to the fuel panel 25 and the fuel panel 27 has a right hinge portion 69 and a left latch edge portion 71. The right hinge portion 69 is similar in construction to the hinge edge portion 55 of the fuel panel 25. In this connection the hinge portion 69 has a series of projections 73 that are sized to fit between the adjacent hinge members 29 and 39 of the adjacently located panels 16. The hinge portion 69 also has a series of indentations 75 located adjacent to each projection 73 that are sized to receive the hinge projections 29 and 39 of the adjacent panels 16. The left latch edge portion 71 has a substantially straight rolled portion 77 with indentations 79 that are located to be opposite the location of the projecting latch portions 65 of the panel 25. As indicated in FIG. 5, the rolled straight edge portion 77 is crimped around and securely holds a circular cross section pin 81. This pin 81 is exposed at the indentation 79 and is sized to be engaged by the hook portion 67 of the projecting latch portion 65 so that the fuel panels 25 and 27 are latched together by the latch portion 65 and the engaged pin 81 in a manner that will hereinafter be described in further detail.

The details of how the panels 16 are interconnected to each other are illustrated in FIGS. 3 and 4. As illustrated, the shank portion 47 of the hinge pin member 45 passes through the apertures or holes 51 in the hinge members 29 of the panel 16 and the holes 54 in the hinge members 59 of the fuel panel 25 or the holes 56 in the hinge members 73 of the fuel panel 27 so that the panel 16 and the adjacent fuel panel 25 or 27 are pivotally connected together. However, the projections 39 of the adjacent panels 16 are connected to the shank portion 47 by being hooked into place with a hook portion 83 of the projection 39 being located in place around the shank portion 47 of the hinge pin 45 so that the panel 16 is pivotally connected to the hinge member 29 and hence to the adjacent panel 16 and to the fuel panel 25 or 27 whose respective projections 59 or 73 are pivotally connected to the shank portion 47 of the hinge pin 45. Since the adjacent panels 16 are clipped together in the previously described manner it will be appreciated that these panels 16 can be readily disconnected by pulling them apart when it is desired.

FIG. 5 illustrates the details of the projecting latch portion 65 of the fuel panel 25 and the associated portion of the panel 27. As illustrated, the projecting latch portion 65 has an engaging portion 67 that is shaped like a hook that snaps over the associated exposed portion 85 of the pin 81. In this manner the fuel panels 25 and 27 are latched together. Unlatching can be accomplished by pushing inward on the panel 27 in the direction indicated by the letter I in FIG. 5.

As illustrated in FIG. 1 and as previously described, there are a plurality of fuel holding chambers 23 located on the inside of the hollow cooking enclosure 12. An enlarged view of a portion of one of these fuel holding containers 23 is illustrated in FIG. 2. As illustrated in FIG. 2, the fuel container 23 has three substantially flat sides. Two of these sides are formed by the fuel panels 25 and 27 that have the pattern of small holes 80 and 82 and the third side is formed by one of the panels 16 that forms part of the circular shaped hollow cooking enclosure 12.

As a result of this arrangement, the fuel panels 25 and 27 are capable of rotating with their edge portions 55 and 69 connected to the hinge pin members 45 that interconnect the panel 16 to the fuel panels 25 and 27 so that the fuel panels 25 and 27 can be manually folded toward and be placed against the adjacent panel 16 in a manner indicated by the arrows A and B in FIG. 2. Of course, in doing this one fuel panel 25 or 27 will lie against the other fuel panel 25 or 27. This arrangement permits the fuel panels 25 and 27 to be completely folded for storage with the hollow cooking enclosure 12 and its panels 16.

The fact that a portion of the hollow cooking enclosure 12 is also used to form part of the chamber or container for the fuel 23 is important since this serves to reduce the required structure and also the volume and weight of the collapsible cooking apparatus 10. Since the panel 16 that forms part of the fuel container 23 has a reflective surface, this focuses the heat from the fuel inward toward the center of the hollow cooking enclosure 12. This increases the efficiency of heating with the fuel as well as reducing the heat on the outside of the hollow cooking enclosure 12. The holes 80 and 82 in the fuel panels 25 and 27 also increases the efficiency of heating with the fuel.

It has been unexpectedly determined for the six fuel chamber 23 embodiment of the invention 10 set forth in FIG. 1, that the volume of the fuel chamber or container 23 formed by the fuel panels 25 and 27 and the interconnecting panel 16 should be related to the volume of the hollow cooking enclosure 12 as set forth below:

$$A \times V1 = V2$$

$$25 \leq A \leq 55$$

Where:
V1=Volume of the interior of the fuel chamber 23
V2=Volume of the interior of the cooking enclosure 12
In the preferred embodiment A is substantially equal to 40.

Figure 6:
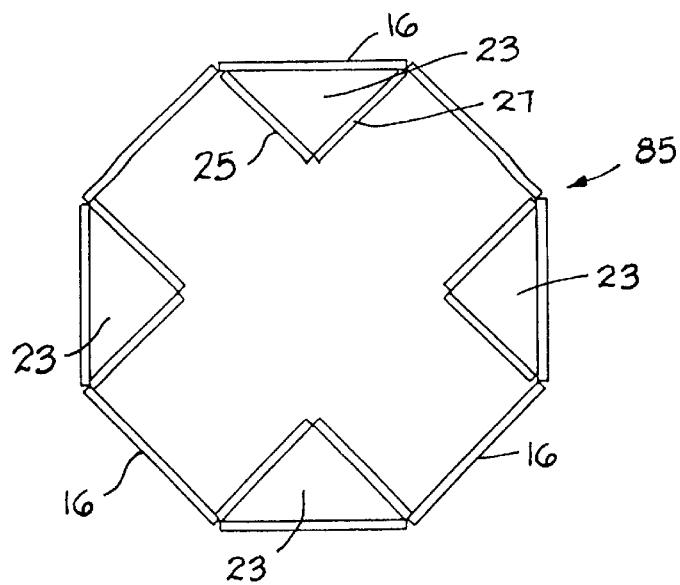
FIG. 6 is a top plan view of a modification of the cooking enclosure portion of the collapsible cooking apparatus invention.

The fact that the panels 16 that make up the cooking enclosure 12 are connected to each other by having their edge portions clipped together manually gives the enclosure 12 flexibility by allowing the size and volume of the enclosure 12 to be varied. FIG. 6 along with FIG. 1 illustrate how this is accomplished. As illustrated in FIG. 1, the cooking enclosure 12 is made up of twelve panels 16 with six fuel chambers 23. However, by removing four panels 16 and two sets of fuel panels 25 and 27, that form the fuel chamber 23 with one of the removed panels 16, this results in the cooking enclosure designated generally by the number 85 that has only eight panels 16 and four fuel chambers 23. This reduced size cooking enclosure 85 provides a more fuel efficient cooking structure when a smaller meal is desired.

As illustrated in FIG. 1, the collapsible suspension structure 14 has a substantially circular shaped thin top plate 87 that has a centrally located hook 89 on its lower surface as well as three pivot point structures 91 located on the lower surface of the top plate 87. These pivot point structures 91 can be secured to the top plate 87 in a suitable manner known in the art such as by welding. The collapsible suspension structure 14 also has three elongated hollow legs 93 that are designed to be rotatably connected by the pivot point structures 91 to the top plate 87 and to depend downwardly from the top plate 87.

Each elongated leg 93 is formed or assembled from three equal length hollow tubes 95, 97, and 99 that are interconnected. The tubes 95 that are to be located farther from the top plate 87 are smaller in diameter in size than the intermediate tubes 97 and these in turn are smaller in diameter in size than the tubes 99 that are located adjacent to and are connected to the top plate 87. Consequently, tube 95 fits inside tube 97 and tube 97 in turn fits into tube 99. The lower end portions of the tubes 97 and 99 are formed to hold respective rotatable internally threaded connecting members 102 and 104 that accept threads on the upper end portions 106 and 108 of the respective tubes 97 and 95. The upper tubes 99 have holes 103 in them that can be used to hang food that is to be suspended for cooking or warming. Rubber feet or pads 107 may be attached to the bottom of the hollow legs 93. The fact that the tubes 95 and their connecting members 104 are smaller in diameter in size than the intermediate tubes 97 and that the intermediate tubes 97 and their connecting members 102 are smaller in diameter in size than the tubes 99 permits the tubes 95 and their connecting members 104 to be stored within the tubes 97 and the tubes 97 and their connecting members 102 to in turn be stored within the tubes 99.

The collapsible cooking apparatus 10 is made and used in the following manner. The cooking chamber plates 16 are stamped from 0.02 inch aluminum sheet and are formed using conventional stamping and forming techniques known in the art. The hinge pin members 45 are cut from suitable size aluminum wire with a circular cross section and one end is formed using conventional techniques to produce the head portion 49. The fuel panels 25 and 27 are cut from 0.02 inch aluminum sheet and their edges are formed by folding using conventional cutting and forming techniques known in the art.

The top plate 87 is cut from suitable aluminum plate and the pivot structures 91 are formed from aluminum by conventional forging and drilling techniques. The leg segments 95, 97 and 99 are cut from suitable hollow aluminum tube and their ends are formed using suitable threading and forming techniques known in the art. The connecting members 102 and 104 are formed from aluminum castings or forgings using techniques known in the art. The rubber feet or pads 107 are available from various suppliers known in the art.

The collapsible cooking apparatus 10 is used in the following manner. Usually, the cooking enclosure 12 would be assembled first. This is accomplished by manually hooking together the unconnected edges 18 and 20 of any panels 16 that have been unhooked to form the hollow shaped cooking enclosure 12. Normally, the panels 25 and 27 would be connected to the adjacent panel 16 and all that is necessary is to manually latch the edges of the panels 25 and 27 through the use of the latch portions or members 65 to form the fuel chambers 23. The assembled cooking enclosure 12 with the assembled fuel chambers 23 is then located over a disposable foil bottom 22 that has been laid upon the ground or other suitable surface that is free from materials that could be ignited. The fuel chambers 23 would then be filled using suitable size charcoal or the like.

The suspension structure 14 is then assembled by removing the leg tube portions 97 from their stored locations within the leg tubes 99 and removing the leg tube portions 95 from their stored position within the leg tube portions 97 and securing the leg tube portion to the adjacent leg tube portions 99 by use of the internally threaded connecting members 104 and securing the leg tube portions 95 to the portions 97 by use of the internally threaded connecting members 102 in a conventional manner. When the legs 93 have been appropriately assembled, they are pivoted outwardly from the top plate 87 a suitable amount so that the legs 93 can be located around the assembled hollow cooking enclosure 12 with their pads 107 resting upon the ground or other similar surface. After the fuel is ignited, cooking would be accomplished in a conventional manner. In this connection, the hook 89 and the holes 103 in the upper tubes 99 of the support legs 93 can be used to suspend hooks or other conventional cooking gear or utensils for holding food for cooking and/or warming in a conventional manner. After cooking has been completed the cooking apparatus 10 can be disassembled by reversing the assembly process and then be cleaned for storage.

Figure 7:
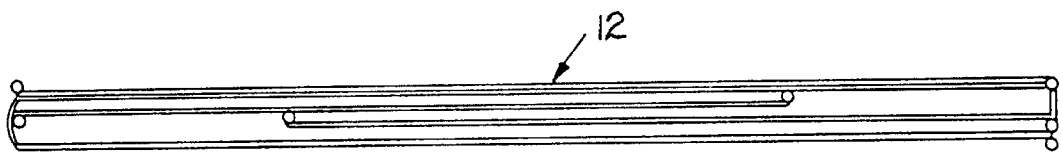
FIG. 7 is a side elevational view of the cooking enclosure portion of the invention set forth in FIG. 1 in its collapsed or stowed configuration.
Figure 8:
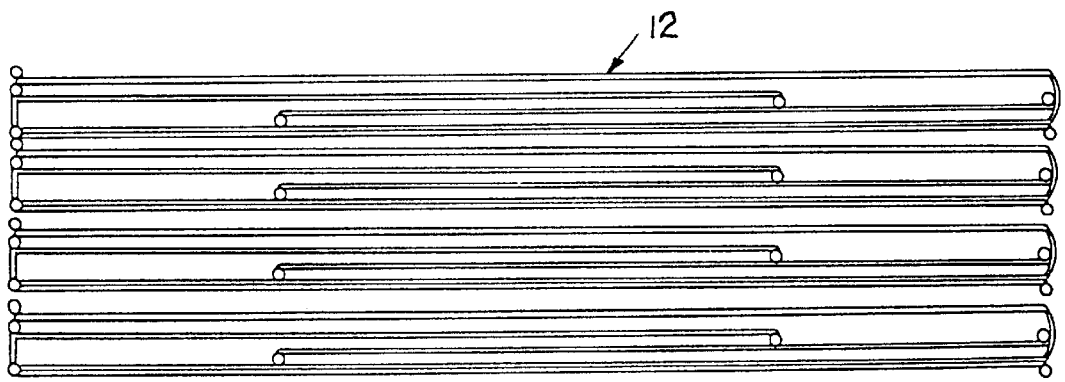
FIG. 8 is a side elevational view of the cooking enclosure portion of the invention set forth in FIG. 7 in an alternate collapsed or stowed configuration.

In view of the construction of the cooking apparatus 10 in particular, the construction of the collapsible cooking enclosure 12, the cooking apparatus 10 can be stored in a variety or various configurations. This is made possible by the fact that the panels 16 that form the cooking enclosure 12 can be separated from each other merely by unhooking their edges. Consequently, packages of various numbers of panels 16, 25 and 27 can be made up for storage purposes. This is illustrated in FIGS. 7 and 8 where two different shapes of the same number of stacked panels 16, 25, and 27 are illustrated. This feature is important in situations where space is limited or the available storage space has a particular configuration such as would possible be the case in backpacking or on canoeing trips. It should be noted in FIG. 7 that their are stacked panels 16, 25 and 27 located behind the visible panels 16, 25 and 27 that are obscured by the visible panels 16, 25 and 27.

Although the invention has been described in considerable detail with reference to certain preferred embodiments, it will be understood that variations or modifications may be made within the spirit and scope of the invention as defined in the appended claims.

What is claimed is:

1. A collapsible cooking apparatus comprising:

a collapsible generally circular shaped cooking enclosure having a hollow interior formed from a series of cooking enclosure panels each having two hinged edges with said cooking enclosure panels being hinged together by said hinged edges, a plurality of collapsible fuel containers located in the hollow interior of said collapsible generally circular shaped cooking enclosure for holding fuel, said collapsible fuel containers each being formed by a cooking enclosure panel and two fuel chamber panels wet each fuel chamber panel having a hinged edge and a latch edge with said fuel chamber panels being hinged at the hinged edge of said fuel chamber panel to a hinged edge of a cooking enclosure panel whereby said fuel chamber panels are movable between a latched position and an open position, and a collapsible suspension structure for suspending articles above or within said collapsible generally circular shaped cooking enclosure for cooking or warming.

2. The collapsible cooking apparatus of claim 1 wherein the hinged edge of said fuel chamber panels comprises means for allowing said fuel chamber panels to be folded toward and placed against said cooking enclosure panels.

3. The collapsible cooking apparatus of claim 2 wherein the hinged edges of said series of said cooking enclosure panels comprise disconnecting means for disconnecting the hinged edge of a cooking enclosure panel from the adjacent hinged edge of the adjacent cooking enclosure panel.

4. The collapsible cooking apparatus of claim 3 wherein said disconnecting means for disconnecting the hinged edge of a cooking enclosure panel from the adjacent hinged edge of the adjacent cooking enclosure panel comprises at least one projection having a hook portion.

5. The collapsible cooking apparatus of claim 4 wherein the latch edge with said fuel chamber panels comprises unlatching means for unlatching said fuel chamber panels by pushing inward on said fuel chamber panels.

6. The collapsible cooking apparatus of claim 5 wherein said fuel chamber panels have a pattern of apertures in them for transmitting radiant heat.

7. The collapsible cooking apparatus of claim 6 wherein said cooking enclosure panels forming part of said collapsible fuel containers have a reflective surface.

8. The collapsible cooking apparatus of claim 1 wherein said collapsible fuel containers and said collapsible cooking enclosure have volumes and wherein the volume of said fuel container is related to the volume of said cooking enclosure as follows:

$$A \times V1 = V2$$
$$25 \leq A \leq 55$$

Where:
$V1$=Volume of the interior of said fuel container
$V2$=Volume of the interior of said cooking enclosure.

9. The collapsible cooking apparatus of claim 8 wherein $A$ is substantially equal to 40.

* * * * *